United States Patent [19]

Suzuki et al.

[11] Patent Number: 4,637,850
[45] Date of Patent: Jan. 20, 1987

[54] PRESS APPARATUS FOR PLANAR MEMBERS

[75] Inventors: Kazunori Suzuki, Yokohama; Hiroo Katsuta, Kawasaki; Yuki Toriumi, Tokyo, all of Japan

[73] Assignee: Canon Kabushiki Kaisha, Tokyo, Japan

[21] Appl. No.: 670,008

[22] Filed: Nov. 9, 1984

[30] Foreign Application Priority Data

Nov. 22, 1983 [JP] Japan ................................. 58-218745
Nov. 29, 1983 [JP] Japan ................................. 58-223138

[51] Int. Cl.⁴ ........................ B30B 15/30; B30B 15/32
[52] U.S. Cl. ..................................... 156/60; 100/215; 100/218; 100/258 R; 156/99; 156/362; 156/497; 156/566; 156/571; 156/580
[58] Field of Search ............... 156/362, 497, 566, 570, 156/571, 580, 583.1, 60, 99; 100/93 P, 215, 218, 258 R, 258 A

[56] References Cited

U.S. PATENT DOCUMENTS

| 3,400,031 | 9/1968 | Cathern, III .................... 156/566 |
| 3,655,316 | 4/1972 | Hüsges .......................... 100/218 |
| 3,909,343 | 9/1975 | Posselt .......................... 100/215 |
| 4,032,387 | 6/1977 | Sugiyama et al. ............... 156/580 |
| 4,189,271 | 2/1980 | Hasegawa ....................... 156/566 |
| 4,348,252 | 9/1982 | Knoop et al. ................... 156/538 |

Primary Examiner—Michael Wityshyn
Attorney, Agent, or Firm—Fitzpatrick, Cella, Harper & Scinto

[57] ABSTRACT

A press apparatus for planar members is provided with a first transfer table for transferring a first planar member to a press position, a second transfer table for transferring a second planar member to the press position substantially simultaneously with the first transfer table, a device for aligning the first and second planar members, a device for effecting the parallel feeding of the first and second planar members, and a device for pressing the first and second planar members with a predetermined pressure.

16 Claims, 15 Drawing Figures

PRESS APPARATUS FOR PLANAR MEMBERS

BACKGROUND OF THE INVENTION

1. Field of the Invention

This invention relates to a press apparatus for cementing two planar members (for example, glass plates for liquid crystal) together efficiently and highly accurately.

2. Description of the Prior Art

Products using liquid crystal cells have already been established as the parts of optical instruments, electronic instruments, timepieces, etc. However, the usage thereof has been widened more and more. For example, as can be seen from the fact that liquid crystal televisions, large dot displays, display systems for automobiles, thermometers, etc. have been developed one after another, products using liquid crystal have been produced over a very wide field. To produce such liquid crystal cells, the following steps must be completed: the steps of "glass washing, pattern deposition by evaporation, resist printing, exposure, etching, oriented film coating, stripping, rubbing treatment, application of adhesive agent, etc." Now, there is the most important treatment in the step of positioning the alignment marks of two glass plates completely subjected to the above-mentioned steps and cementing the glass plates together. Since the cementing accuracy or the operator's efficiency at this time is generally related directly to the reliability and productivity of finished liquid crystal cells, how accurately and efficiently the glass plates can be cemented together is a great point to manufacturers of liquid crystal.

Here, a liquid crystal cementing apparatus according to the prior art will be described with reference to FIG. 1 of the accompanying drawings.

First, at the initial set position, an upper glass plate is adsorbed to a glass adsorbing movable plate 1 so that the surface of the upper glass plate which is to be cemented faces downward. Also, a lower glass plate is adsorbed to the glass adsorbing movable plate 1 in a predetermined spaced apart relationship with the upper glass plate so that the surface of the lower glass plate which is to be cemented faces upward. Then, the glass adsorbing movable plate 1 is rectilinearly moved manually so that the upper glass plate thereon lies just beneath an upper glass adsorbing plate 2. Next, when the central portion of the upper glass adsorbing plate 2 suspended by four posts 5 and a spring 6 from an alignment base plate 9 placed on a ball receiver 8 supported by a bed 3 is pressed by a lever bar 4, the upper glass adsorbing plate 2 comes into contact with the upper glass plate adsorbed to the glass adsorbing movable plate 1.

The upper glass adsorbing plate 2 starts adsorption, while the adsorption of the glass adsorbing movable plate 1 is released, whereby the upper glass plate is shifted from the glass adsorbing movable plate 1 to the upper glass adsorbing plate 2.

Subsequently, the glass adsorbing movable plate 1 is rectilinearly moved so that the lower glass plate adsorbed thereto lies just beneath the upper glass adsorbing plate 2, and is fixed by a positioning pin 7.

Thus, the upper and lower glass plates become opposed to each other, and alignment marks provided on the upper and lower glass plates are observed by means of two observation devices 10. That is, the deviation between the upper and lower alignment marks is visually observed by means of the observation devices 10, and the alignment base plate 9 is operated by means of two manipulators connected to the alignment base plate 9, thereby modifying the deviation between the upper and lower alignment marks. After the alignment marks have become coincident with each other, the lever bar 4 is again pressed manually to thereby effect the cementing of the upper and lower glass plates.

However, such apparatus according to the prior art has a disadvantage that much time is required before the upper and lower glass plates are set at the press position. Moreover, all the operation is effected manually and the operator directly handles the glass plates, and this leads to a disadvantage that stains such as dust and fingerprints or damages are liable to be imparted to the glass plates. Also, depending on the ability of the operator, the accuracy of alignment or the press pressure during the cementing is not stable and the working efficiency is remarkably irregular, and this means a disadvantage in respect of productivity.

SUMMARY OF THE INVENTION

It is an object of the present invention to provide an apparatus which can cement liquid crystal glass plates or the like together efficiently and highly accurately.

It is another object of the present invention to provide an apparatus which can efficiently convey liquid crystal glass plates or the like to a press position and cement them together highly accurately even if the size of the glass plates more or less departs from the standard size.

It is still another object of the present invention to provide an apparatus which can cement liquid crystal glass plates or the like together highly accurately even if the glass plates have taper or slope.

DESCRIPTION OF THE PREFERRED EMBODIMENTS

Figure 1:
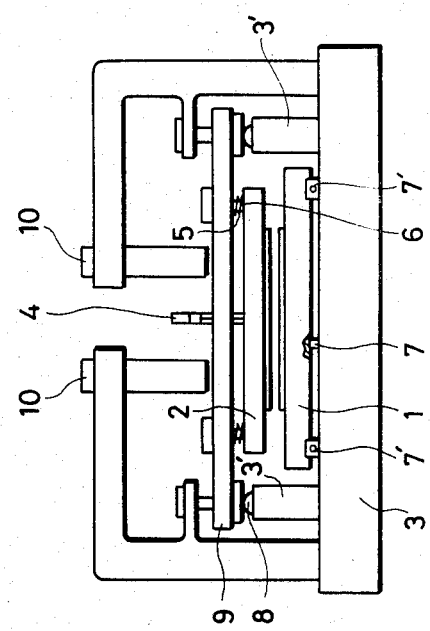
FIG. 1 shows a liquid crystal cementing apparatus according to the prior art.
Figure 2:
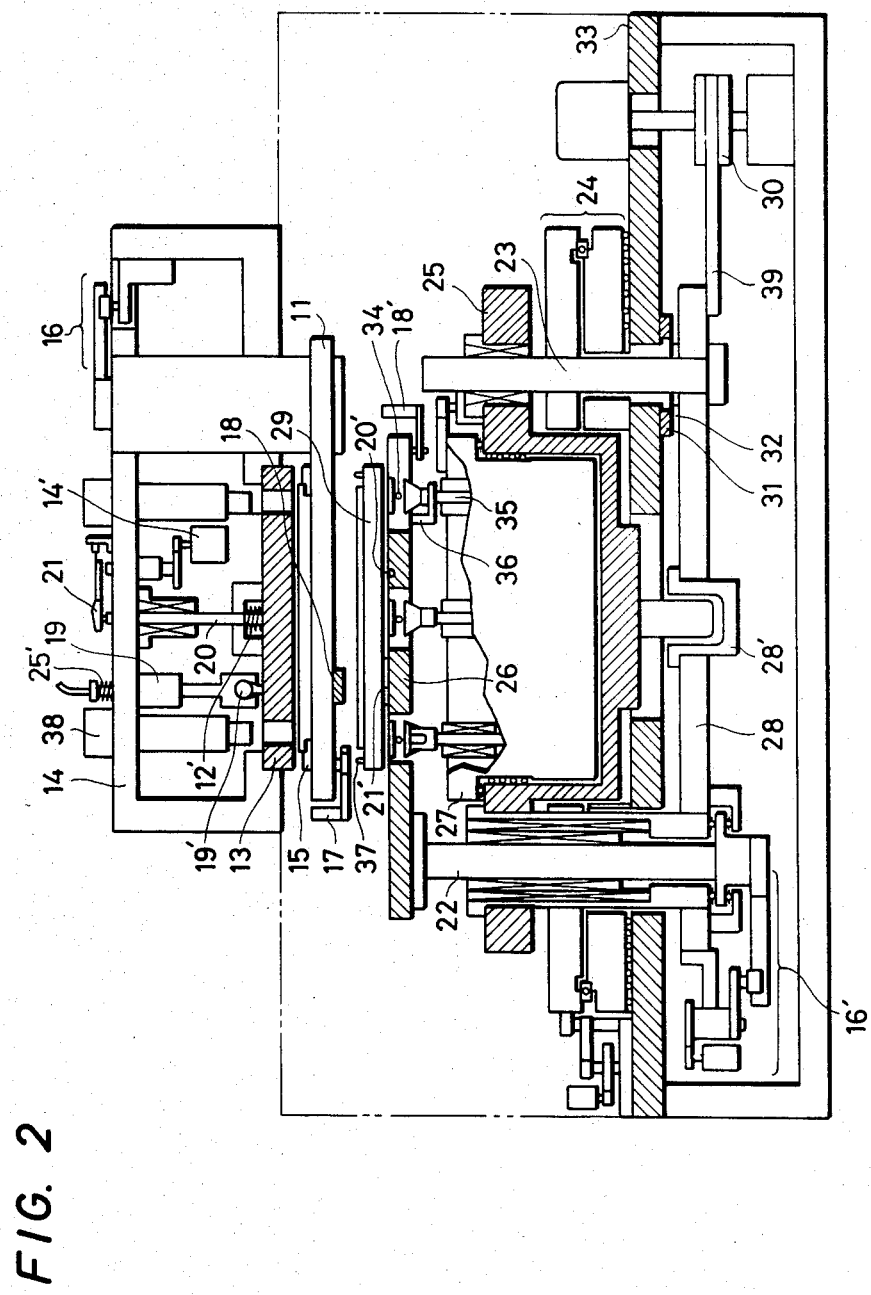
FIG. 2 shows an embodiment of the present invention.

Referring to FIG. 2, an upper glass plate conveying table 11 and a chuck 13 for upper glass plate are installed in a unitary rigid box 14. There is a Geneva mechanism 16 on the right side of the unitary rigid box 14, and by this Geneva mechanism 16, the upper glass plate conveying table 11 may be rotated in its horizontal position by 90° in a clockwise or counterclockwise direction. Adsorbing plates 15 each provided with an adsorbing groove and provided in XY direction are mounted on the upper surface of the upper glass plate conveying plate 11, and further, a pin for positioning the glass plate or the like is incorporated in the upper surface of the upper glass plate conveying table 11. On the underside of the upper glass plate conveying table 11, there is a horizontal keep plate 18 for preventing flexure, and on the left side of the upper glass plate conveying table 11, there is a hook 17 for position fixing. The chuck 13 for upper glass plate is suspended and held by four posts 19 incorporated in and supported by the unitary rigid box 14. The chuck 13 for upper glass plate and the four posts 19 are fixed by a ball receiver 19' provided with an adsorbing hole and are guided by ball bushings for moving the four posts 19 only in Z direction (the vertical direction as viewed in FIG. 2). Further, at the center of the upper surface of the chuck 13 for upper glass plate, a push bar 20 is uprightly provided through a spring 12' and is incorporated in the unitary rigid box 14 for movement in Z direction. The push bar 20 is operatively associated with the chuck 13 for upper glass plate and is installed in the unitary rigid box 14 to vertically move the chuck 13 for upper glass plate. A lever bar 21 is provided on the upper end of the push bar 20 and may be operated by a motor 14' which is a drive source and a push screw or the like. The push bar 20 is held by the chuck 13 for upper glass plate through the spring 12'. A lower glass plate conveying table 26 is provided with several cut-away portions in which give-and-take pins 34 are provided, and an adsorbing plate 21' and a pin 20' are mounted on the upper surface of the lower glass plate conveying table 26, and a chuck 29 for lower glass plate is placed on the lower glass plate conveying plate 26 through the adsorbing plate 21' and the pin 20'. Designated by 37 is a gap sensor mounted on the chuck 29 for lower glass plate. This gap sensor 37 is used to parallel-feed the chuck 13 for upper glass plate and the chuck 29 for lower glass plate at the set reference position. A hook 18' for position fixing is provided on the right side of the lower glass plate conveying table 26. Also, three-point support give-and-take shafts 35 which will later be described are adapted to slide vertically in the aforementioned several cut-away portions of the lower glass plate conveying table 26.

Four Z-direction support support shafts 23 are provided uprightly on a base plate 33, and an XY direction stage 24 placed on the base plate 33 is supported by the four Z direction support shafts 23. On the base plate 33, a lower conveyor shaft 22 is provided uprightly in opposed relationship with the Z direction support shafts 23. A Z direction stage 25 is fitted on the Z direction support shafts 23 and the lower conveyor shaft 22. A Geneva mechanism 16' is provided at the lower end of the lower conveyor shaft 22, and the lower glass plate conveying table 26 is supported on the upper end of the lower conveyor shaft 22. The Z direction stage 25 is formed with a recess in which is fitted a θ stage 27 which may change the angle θ in the direction of rotation. Three-point support give-and-take shafts 35 are incorporated in the θ stage 27, and sensors 36 are mounted on the upper ends of these three-point give-and-take shafts 35. The positions at which the sensors 36 are mounted correspond to the equally divided positions of the outermost periphery of the chuck 29 for lower glass plate.

As previously described, the give-and-take pins 34 are mounted on the back of the chuck 29 for lower glass plate which lies on the lower glass plate conveying table 26, and the underfaces of the give-and-take pins 34 face the three-point support give-and-take shafts 35. The lower ends of the aforementioned lower conveyor shaft 22 and four support shafts 23 are fixed by a coupling plate 28. The coupling plate 28 is provided with an air cylinder 28' which is adapted to lift and fix the Z direction stage 25 and the θ stage 27 through a pusher. Also, the coupling plate 28 is coupled by a connecting plate 39 and is connected to a manual manipulator and an air clutch plate 30 for changing over the manipulator to automatic operation. The four support shafts 23 and the lower conveyor shaft 22 extend through the base plate 33. Air pads 31 for fixing the XY direction stage 24 are held by plate springs 32 mounted on the four support shafts 23 and are in contact with the base plate 33. The air pads 31 are capable of adsorbing and discharging air. At least three parallel-feeding gap sensors 37 are mounted on the chuck 29 for lower glass plate or the chuck 13 for upper glass plate, and two or more observation devices 38 are mounted in the unitary rigid box 14 so that the positions of the marks of the upper and lower glass plates can be observed and further the amount of gap can be measured. The amount of displacement of the positions of the marks and the amount of gap measured by the observation devices 38 are taken out as video signals into a TV, the amount of displacement of the marks is detected by the utilization of the scanning lines of the TV and operation-processed by a CPU, whereby each driving system can be controlled to accomplish automatic positioning. Also, in the amount of gap, a reflected light having the difference in optical path between the upper and lower glass plates is taken out by the utilization of white illumination and Wolaston prism which are well-known techniques and by the use of white interference fringes, and the interference fringes are shaped up and the shafts 35 are individually driven by a signal obtained by electrically converting the pitch of the interference fringes, whereby a parallel gap can be set.

Operation will now be described. In the initial give-and-take position of the upper and lower glass plates, the upper glass plate conveying table 11 and the lower glass plate conveying table 26 wait for the glass plates being automatically placed thereon. When the glass plates are placed on the upper glass plate conveying table 11 and the lower glass plate conveying table 26, respectively, the upper glass plate conveying table 11 and the lower glass plate conveying table 26 are rotated by 90° clockwisely and counter-clockwisely, respectively, while being held at their horizontal position by the Geneva mechanisms 16 and 16', and come to their positions of FIG. 2 substantially at a time. When the conveying tables 11 and 26 come to these positions, they are detected by a sensor and, by the detection signal, the upper glass plate conveying table 11 is fixed at a predetermined position with the aid of the operations of the upper hook 17 and the horizontal keep plate 18'. The upper glass plate is then positioned by the XY direction glass adsorbing plate 15 on the upper glass plate conveying table. When the motor 14' and the push screw are then operated to actuate the lever bar 21, the push bar is moved downwardly to press the spring 12' and move the chuck 13 for upper glass plate downwardly. Thereby, the chuck 13 for upper glass plate is brought into contact with the upper glass plate on the upper glass plate conveying table 11. Subsequently, the adsorption of the chuck 13 for upper glass plate is detected by an air pressure sensor or the like, the adsorption of the upper glass plate conveying table 11 is released, the air adsorption to the ball receiver provided with an adsorption hole is started and the upper glass plate is adsorbed to the underface of the chuck 13 for upper glass plate. Then, the chuck 13 for upper glass plate is lifted to the dash-surface of the unitary rigid box 14 by the operation of the motor 14' and the push screw. Hereupon, as previously described, the lower glass plate conveying table 26 is also rotated by 90° counter-clockwisely substantially simultaneously with the upper glass plate conveying table 11 and comes to its position of FIG. 2. Then its position is detected by a sensor or the like and it is fixed by the hook 18'. The chuck 29 for lower glass plate is fixed and positioned on the lower glass plate conveying table 26 by the pin 20' and three adsorbing plates 21'. Subsequently, in order to move the XY direction stage 24 supported by the four support shafts 23 through the connecting plate 39 and the coupling plate 28, by means of a manipulator, and fix it to the base plate 33, air is adsorbed to the plate spring 32 and the air pads. Then, the upper glass plate conveying table 11 is rotated by 90° counter-clockwisely in the horizontal direction by the operation of the Geneva mechanism 16 and moved to the original glass plate delivery position. When the three-point support give-and-take shafts 35 are then moved up by the Z driving portion, the adsorption-coupling between the chuck 29 for lower glass plate and the lower glass plate conveying table 26 is released by the operation of the aforementioned sensor 36 and subsequently, by the chuck 29 for lower glass plate being adsorption-coupled to the three-point support give-and-take shafts 35, the give-and-take pins 34 of the chuck 29 for lower glass plate are inserted into the three-point support give-and-take shafts 35 and thus, they become integral with the latter. Subsequently, when the Z direction stage 25 is moved up by the air cylinder 28' mounted on the coupling plate 28, the chuck 29 for lower glass plate supported by the three-point support give-and-take shafts 35 moves up to a position whereat it is aligned, together with the $\theta$ stage 27. At this time, the upper glass plate held on the chuck 13 for upper glass plate and the lower glass plate held on the chuck 29 for lower glass plate come to face the adhesive surface. At least three parallel-feeding gap sensors 37 are mounted on the chuck 29 for lower glass plate (such gap sensors may be mounted on the chuck 13 for upper glass plate) and the degree of parallelism of the two upper and lower glass plates is sensed by these gap sensors 37. Further, the positions of the marks of the upper and lower glass plates are observed by means of the observation devices 38 mounted on the unitary rigid box 14 and further, the amount of gap is measured. The amount of displacement of the marks and the amount of gap measured by means of the observation devices 38 are taken out as video signals into a TV, and the amount of displacement of the marks is detected by the utilization of the scanning lines of the TV and is operation-processed by a CPU, and the XY direction stage 24, the $\theta$ stage 27 and three independent shafts 35 can be controlled and automatically aligned.

Subsequently, the aforementioned three-point support give-and-take shafts 35 are operated at a time to move the chuck 29 for lower glass plate upwardly with the parallel gap and the position maintained, and the upper glass plate and the lower glass plate are urged and pressed against each other. After the upper and lower glass plates have been set for an arbitrary time, the adsorption of the upper glass plate to the chuck 13 for upper glass plate is released and the upper glass plate and the lower glass plate are held on the chuck 29 for lower glass plate while remaining bound together. Further, the lower glass plate conveying table 26 and the chuck 29 for lower glass plate are adsorbed to each other and the lower glass plate conveying table 26 is rotated to a take-out position by 90° clockwisely in a horizontal direction by the Geneva mechanism 16'. Then, the two glass plates cemented together are taken out.

Now, where the surfaces of the two glass plates which are to be cemented together are inclined, the amount of gap must be detected by the parallel-feeding gap sensors 37 and the gap between the cemented surfaces of the two glass plates must be adjusted. For this purpose, the three-point support give-and-take shafts 35 for moving up the chuck 29 for lower glass plate must be moved up not only at a time but also individually. An apparatus therefor is shown in FIG. 3.

Figure 3:
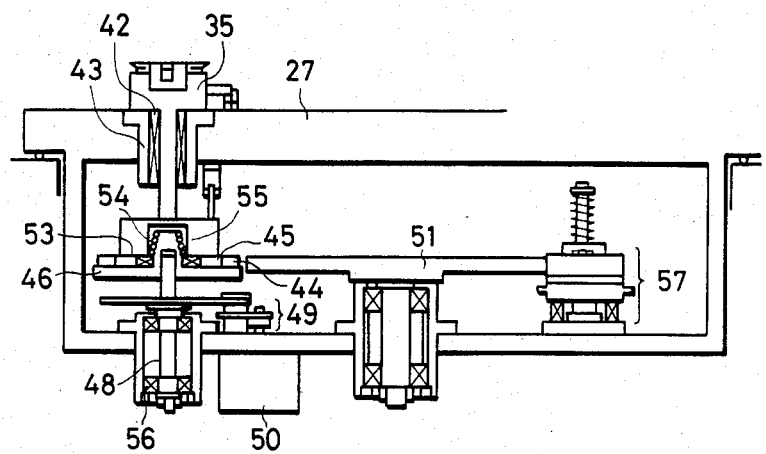
FIG. 3 shows the gap driving portion and the press driving portion in the embodiment of the present invention.

FIG. 3 shows the essential parts of the press driving portion and the gap driving portion. Each of the support shafts 35 provided with adsorbing pads incorporates a bearing 42 and a ball bushing 43 relative to the $\theta$ stage 27. A simultaneous gear 46 is provided below each of the support shafts 35 provided with adsorbing pads, and an air pad plate 44 for adsorbing the simultaneous gear 46 is supported by a plate spring 45. This plate spring 45 is in contact with the upper surface of the simultaneous gear 46. There is a threaded hole at the center of the simultaneous gear 46, and a secrew bar 48 provided with a single gear is accurately threaded into said center and further, the shafts 35 and the simultaneous gear 46 are connected together by bearings 53, 54 and a keep ring 55 which holds down these bearings 53, 54. Also, the shaft of the screw bar 48 provided with a single gear is supported by a bearing 56 and fixed to the bottom surface of the $\theta$ stage 27. A motor 50 for driving the screw bar 48 provided with a single gear transmits its drive to the screw bar 48 provided with a single gear by a large gear meshing with a gear 49, through the gear 49.

On the other hand, the simultaneous gears 46 are provided on the aforementioned support shafts 35 each provided with an adsorbing pad, and an interlocking gear 51 is installed in mesh engagement with the three simultaneous gears 46 so as to be able to drive these three simultaneous gears at a time, and the simultaneous gears 46 are supported by the $\theta$ stage 27. A friction mechanism 57 supported by the $\theta$ stage 27 is in mesh engagement with the interlocking gear 51 and may be driven by a motor.

The gap driving and the press driving operation will now be described. First, in the case of the gap driving, the three support shafts 35 each provided with an adsorbing pad are individually driven by motors (pulse motors) 50 and the drive is transmitted to the screw bar 48 provided with a single gear through the aforementioned gear 49 at a pulse for effecting movement by a required amount of gap. At this time, the support shafts 35 each provided with an adsorbing pad and the simultaneous gears 46 are adsorbed and fixed to each other by the air pads 44 provided on the support shafts 35 and the spring 45. At this time, adsorption does not occur between the other support shafts and the simultaneous gears. Therefore, the simultaneous gears 46 and the support shafts 35 each provided with an adsorbing pad are restrained from rotation and therefore, the support shafts 35 each provided with an adsorbing pad including the simultaneous gears 46 can be moved vertically by the rotation of the screw bar 48 provided with a single gear. Therefore, the three motors 50 are individually driven by individually generated pulses, whereby the gap can be adjusted to a desired gap.

Next, to effect the press driving by the use of the three support shafts 35 each provided with an adsorbing pad, the self-torque of the motors 50 is utilized to fix the screw bar 48 provided with a single gear. Also, when the connection between the shafts 35 and the simultaneous gears 46 is cut off by releasing the adsorption of the air pad plate 44, the simultaneous gears 46 become rotatable. When the friction mechanism 57 which is in mesh engagement with the interlocking gear 51 is driven by a motor, the simultaneous gears 46 which are in mesh engagement with the interlocking gear 51 are rotated to thereby move the shafts 35 vertically. The vertically moved shafts 35 come into contact with and are urged against to a body to be pressed. This urge pressure is controlled by the output of the motor and the sliding friction force of the friction mechanism 57. By setting an arbitrary sliding friction force, idle rotation resulting from sliding is caused by the friction mechanism 57 to thereby provide predetermined press.

Now, in the foregoing description, it will be understood that even if the lower glass plate is inclined and the upper surface of the lower glass plate is inclined with respect to the upper surface of the upper glass plate conveying table 11, the three shafts 35 are operated individually to incline the chuck 29 for lower glass plate, whereby the upper surface of the lower glass plate can be made parallel to the upper surface of the upper glass plate conveying tabel 11.

Where the upper glass plate is inclined and the upper surface of the upper glass plate is inclined with respect to the upper surface of the upper glass plate conveying table 11, the chuck 13 for upper glass plate may be inclined in accordance with the inclination of the upper glass plate and can be well adsorbed to the upper surface of the upper glass plate and therefore, the underside of the upper glass plate after adsorbed to the chuck 13 for upper glass plate becomes parallel to the upper surface of the upper glass plate conveying table 11. That is, even if the upper and lower glass plates are inclined, the two contact surfaces, i.e., the upper surface of the lower glass plate and the underside of the upper glass plate, can be made parallel to each other.

Description will now be made of a conveying system for conveying the upper and lower glass plates to a press stage. The following two points are taken into account with regard to the conveying system: (1) To avoid the contact of the operator's hand fingers or the like with the glass substrate by automatizing the supply and carrying-out of the glass substrate to the cementing apparatus or the like, and to enable the body to be conveyed in the automatic conveyance path without touching the effective surface except the edge portion of one surface of the glass substrate; and (2) to move the positioning member of the conveying device correspondingly to the difference between the position of the glass substrate on the glass supporting table of the cementing apparatus when the glass substrate is placed and positioned on the supporting table and the position of the cemented and finished glass on the supporting table, thereby preventing the occurrence of unnecessary collision or frictional passage.

Figure 4:
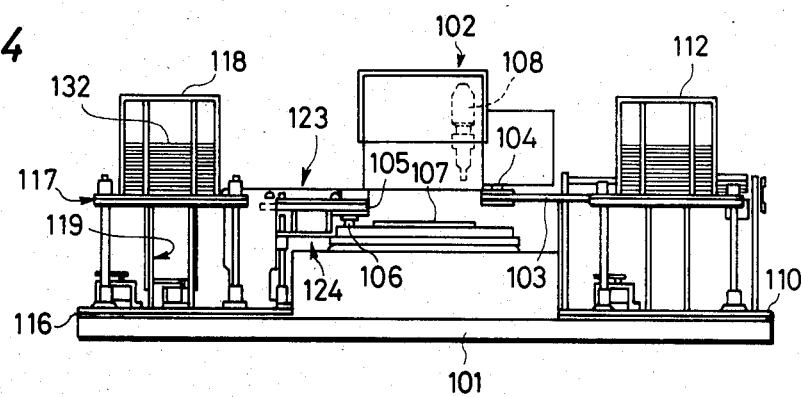
FIG. 4 is a front view of the entire apparatus in which an automatic glass substrate supplying and conveying device is connected to the liquid crystal cementing apparatus.
Figure 5:
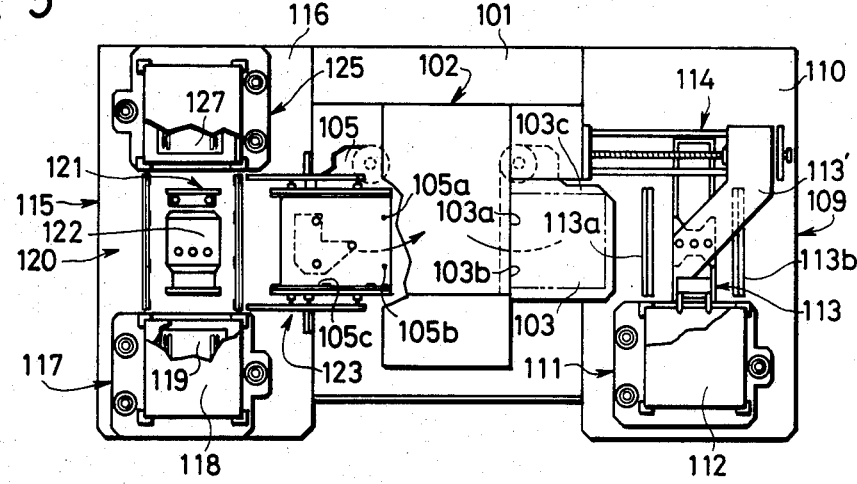
FIG. 5 is a plan view of the same apparatus.

In FIGS. 4 and 5, reference numeral 101 designates a base and an apparatus 102 for cementing glass plates together is provided on the central upper portion of the base 101. A shaft 104 is mounted on the right side of the apparatus 102 for cementing glass plates together, and an upper glass substrate supporting table 103 is pivotably provided on the shaft 104. Positioning pins 103a, 103b and 103c are studded in the upper surface of the upper glass substrate supporting table 103. A shaft 106 is mounted on the left side of the apparatus 102 for cementing glass plates together, and a lower glass substrate supporting table 105 is pivotably provided on the shaft 106. Positioning pins 105a, 105b and 105c are studded in the upper surface of the lower glass substrate supporting table 105. A stage 107 operable back and forth, to the left and right and up and down is provided between the cementing apparatus 102 and the base 101, and an optical device 108 for observing the cementing positioning mark of the glass substrate is provided above the center of the stage 107. Also, on the right side of the apparatus 102 for cementing glass plates together, an automatic upper glass plate supplying device 109 is provided on the base 101.

The automatic upper glass plate supplying device 109 has a cassette lifting device 111 provided uprightly on a sub-base plate 110 provided on the right upper portion of the base 101, and an upper glass plate cassette 112 is provided on the cassette lifting device 111. In FIG. 5, an upper glass plate drawing-out device 113 is mounted adjacent to the upper portion of the cassette lifting device 111, and upper glass plate conveying guide plates 113a and 113b are installed on the opposite outer sides of the upper glass plate drawing-out device 113. Above the upper glass plate drawing-out device 113 (as viewed in FIG. 5), a reciprocal conveying device 114 is mounted in orthogonal relationship therewith. The left side of the reciprocal conveying device 114 is adjacent to the upper glass substrate supporting table 103. The reciprocal conveying device 114 is provided with an upper glass plate adsorbing conveyor 113'. This upper glass plate adsorbing conveyor 113' slidable on the reciprocal conveying device 114 adsorbs and conveys the upper glass plate drawn out from the upper glass plate cassette 112 by the upper glass plate drawing-out device 113. The cassette lifting device 111 is adapted to be lowered by a predetermined distance by a guide strut after an upper glass plate has been taken out by the upper glass plate adsorbing conveyor 113'.

On the left side of the cementing apparatus 102, an automatic lower glass plate supplying and carrying-out apparatus 115 is provided on the base 101. This automatic lower glass plate supplying and carrying-out apparatus 115 is comprised of a lower glass cassette lifting device 117 provided on a sub-base plate 116 lying on the left upper surface of the base 101, a lower glass cassette 118, a lower glass carrying-out device 119, a belt conveyor 120, a guide device 121, a relay conveyor 122, a lower glass plate delivering device 123, a glass lifting device 124, a cemented cassette lifting device 125 and a cemented glass carrying-in device 127. Designated by 132 are glass plates.

Figure 6:
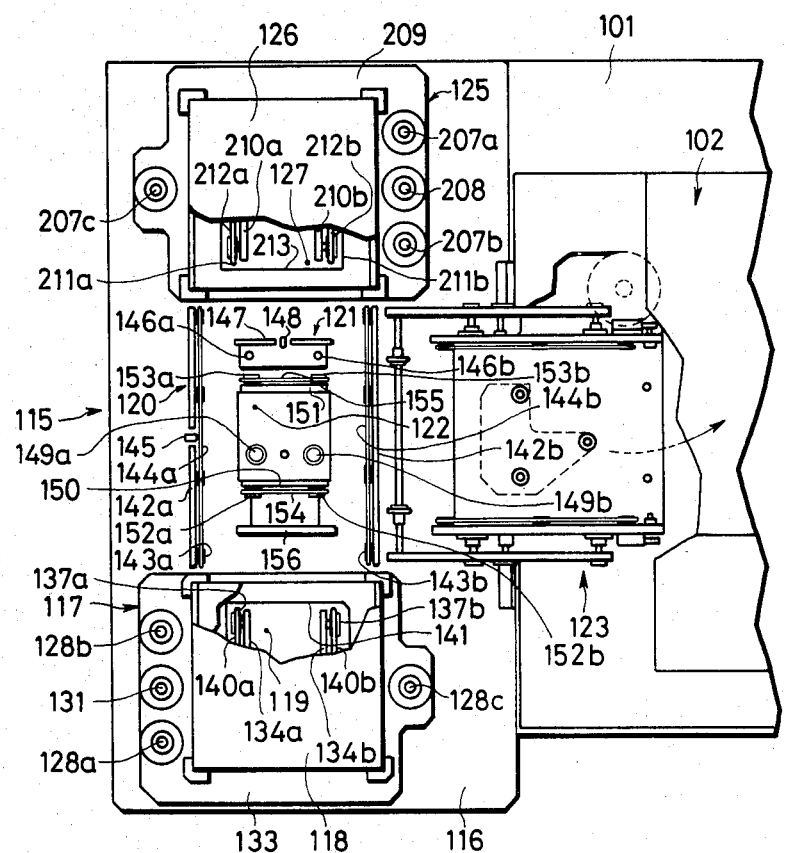
FIG. 6 is a plan view of portions of an automatic lower glass substrate supplying and conveying device.
Figure 7:
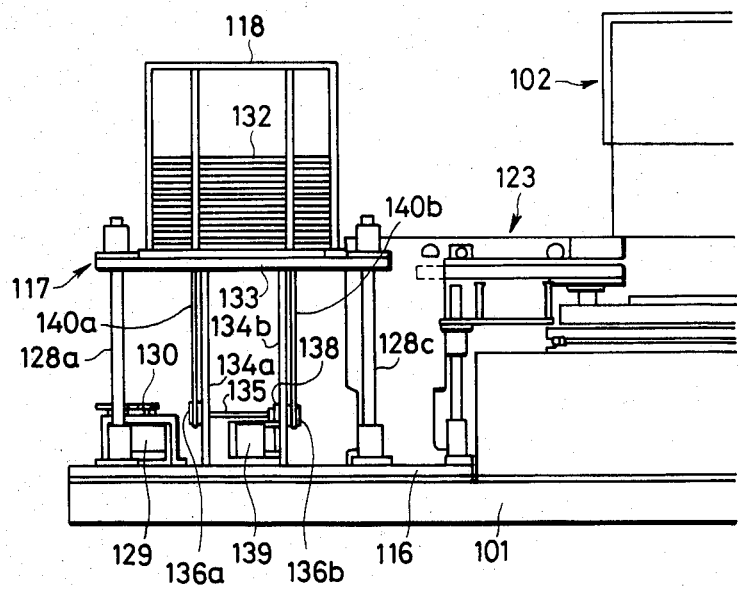
FIG. 7 is a front view of the same portions.

The automatic lower glass plate supplying and carrying-out apparatus 115 will now be described in detail by reference to FIGS. 6 to 8. The lower glass cassette lifting device 117 comprises guide posts 128a, 128b, 128c provided uprightly on the sub-base plate 116 and a feed screw 131 studded on the sub-base plate 116, and the feed screw 131 is adapted to be operated by a motor 129 (FIG. 7) provided on the sub-base plate 116 and a gear 130 connected to the motor 129. A cassette supporting table 133 is fitted on the aforementioned guide posts 128a, 128b, 128c and the feed screw 131 and is adapted to be moved up and down by the guide posts 128a, 128b, 128c and the feed screw 131. In the central portion of the lower glass cassette lifting device 117, the lower glass plate carrying-out device 119 is provided on the sub-base plate 116. Describing the construction of this lower glass plate carrying-out device 119 by reference to FIG. 7, frames 134a and 134b are studded on the sub-base plate 116. A shaft 135 is mounted between and below these frames 134a and 134b, and pulleys 136a and 136b are secured to the opposite ends of the shaft 135. A shaft is mounted on the upper portions of the frames 134a and 134b. Pulleys 137a and 137b (FIG. 6) are rotatably supported on the opposite ends of this shaft. Belts 140a and 140b are passed over the pulleys 136a, 137a and 136b, 137b, respectively. A motor 139 and a gear device 138 are provided at the lower end of the frame 134b, and the aforementioned shaft 135 is operatively associated with the gear device 138. Thus, the pulleys 136a, 136b, 137a, 137b and the belts 140a, 140b are rotatable by the revolution of the motor 139. The lower glass cassette 118 rests on the aforementioned cassette supporting table 133, and a window hole 141 (FIG. 6) is formed in the bottom surfaces of the cassette supporting table 133 and the lower glass cassette 118, and the upper end portions of the frames 134a and 134b of the lower glass carrying-out device 119, the pulleys 137a, 137b and the belts 140a, 140b jut out upwardly through the window hole 141 to bring the belts 140a and 140b into contact with the lowermost glass plate 132 in the lower glass cassette 118. The glass plates 132 are taken out one by one from the lowermost glass plate by the revolution of the motor 139. The glass plates 132 thus taken out are fed to the belt conveyor 120 (FIG. 6). The belt conveyor 120 will now be described. A pair of guide frames 142a and 142b are provided uprightly on the sub-base plate 116, and the guide frame 142a is divided into two parts at the central portion thereof and a switch 145 is provided between the divided parts. A plurality of pulleys 143a and 143b are mounted on these guide frames 142a and 142b, belts 144a and 144b are passed over these pulleys 143a and 143b, and these belts 144a and 144b are moved round by a motor so as to convey the lower glass plates 132. At the upper end portion of the belt conveyor 120 (as viewed in FIG. 6), the guide device 121 is provided uprightly on the sub-base plate 116. This guide device 121 is fitted two guide struts 146a and 146b studded on the sub-base plate 116 and is moved up and down by an air cylinder with the guide struts 146a and 146b as the guide. A side wall 147 is attached to the upper end of the guide device 121 (as viewed in FIG. 6), and this side wall is divided into two parts at the center thereof and a switch 148 is provided between the divided parts. When a lower glass plate 132 bears against the switch 148, the motor 139 of the belt conveyor 120 and the lower glass carrying-out device 119 is stopped and the lower glass plate 132 is stopped.

At the central portion of the belt conveyor 120, the relay conveyor 122 is provided uprightly on the sub-base plate 116. This relay conveyor 122 is fitted on two guide posts 149a and 149b studded on the sub-base plate 116 and is move-d up and down by an air cylinder (not shown) while being guided by the guide posts 149a and 149b. Also, side walls 150 and 151 are mounted vertically of the relay conveyor 122 (as viewed in FIG. 6), and a plurality of shafts are studded on the outer sides of these side walls 150 and 151, and pulleys 152a, 152b; 153a, 153b are provided on these shafts, and-belts 154 and 155 are passed over the pulleys 152a, 152b and 153a, 153b, respectively, and may be moved round by a motor (not shown). On one side (the lower side as viewed in FIG. 6) of the relay conveyor 122, a guide plate 156 is installed on the sub-base plate 116, and the aforementioned side wall 147 and the guide plate 156 guide the lower glass plate 132 on the relay conveyor 122 while controlling the side edges of the lower glass plate.

The glass delivering device 123 will now be described. The glass delivering device 123 lies on the right side of the belt conveyor 120 as viewed in FIG. 6.

The construction of the glass delivering device 123 will hereinafter be described with reference to FIGS. 8 to 15. A pair of struts 157 and 158 are studded on the aforementioned sub-base plate 116 (FIG. 8) and guide shafts 159a, 159b and 160a, 160b are inwardly studded on these struts 157 and 158, respectively. Guide bushings 161a, 161b and 162a, 162b are mounted on these guide shafts 159a, 159b and 160a, 160b, respectively, and movement guide plates 163 and 164 are movably inserted in the guide shafts 159a, 159b and 160a, 160b, respectively. The guide bushings 161a, 161b and 162a, 162b movably mount thereon the movement guide plates 163 and 164. Air cylinders 165 and 166 are mounted on the outer sides of the struts 157 and 158, respectively, and the piston rod of the air cylinder 165 is connected to the piston rod 169 of an air cylinder 168 mounted on the outer side of the movement guide plate 163. Also, the piston rod 169 of the air cylinder 166 is connected to the movement guide plate 164 through a fitting 170 attached to the movement guide plate 164.

A plurality of pulleys 171 and 172 are rotatably supported on the inner surfaces of the movement guide plates 163 and 164 which face each other, and pulleys 173 and 174 are mounted on shafts extending through the movement guide plates 163 and 164, at the inner left end portions (as viewed in FIG. 8) of the movement guide plates 163 and 164 which face each other, and pulleys 175 and 176 are provided on the outer sides of the movement guide plates 163 and 164, respectively. As shown in FIG. 9, a shaft 179 is mounted between and below the struts 157 and 158 and pulleys 177 and 178 are fixed to the shaft 179 on the inner sides of the struts 157 and 158, and belts 184 and 185 are passed between the pulleys 177 and 175 and between the pulleys 178 and 176, respectively, a belt 183 is passed between the pulleys 172 and 174, and a belt 182 is passed between the pulleys 171 and 173. As shown in FIG. 9, a motor 181 is mounted at the lower end of the outer side of the strut 158, a gear 180 is provided on the motor 181, and the shaft 179 is adapted to be rotated by the motor 181 through the gear 180. The belts 184, 185 and 182, 183 may be moved round by rotation of the shaft 179.

Figure 8:
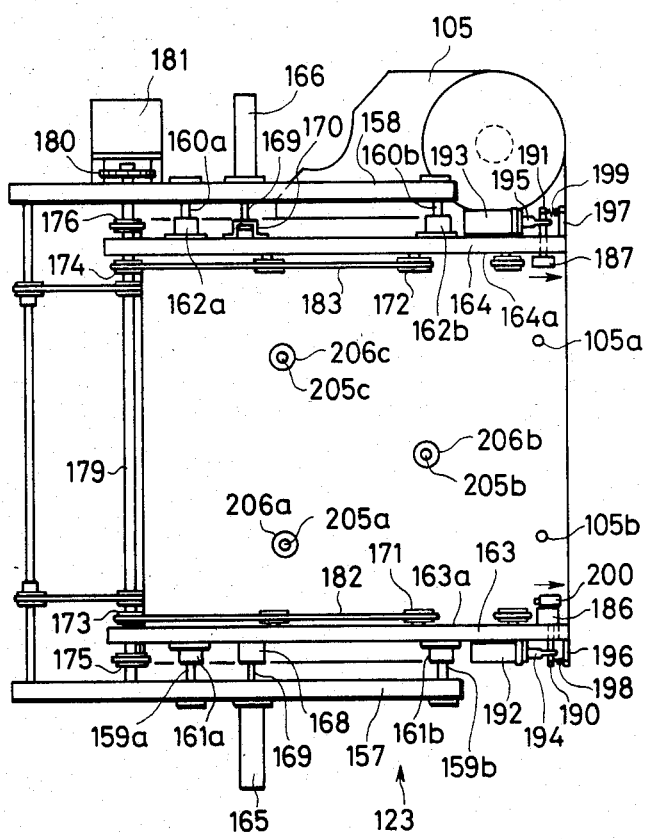
FIG. 8 is a plan view of portions of a glass substrate delivering and conveying device.
Figure 9:
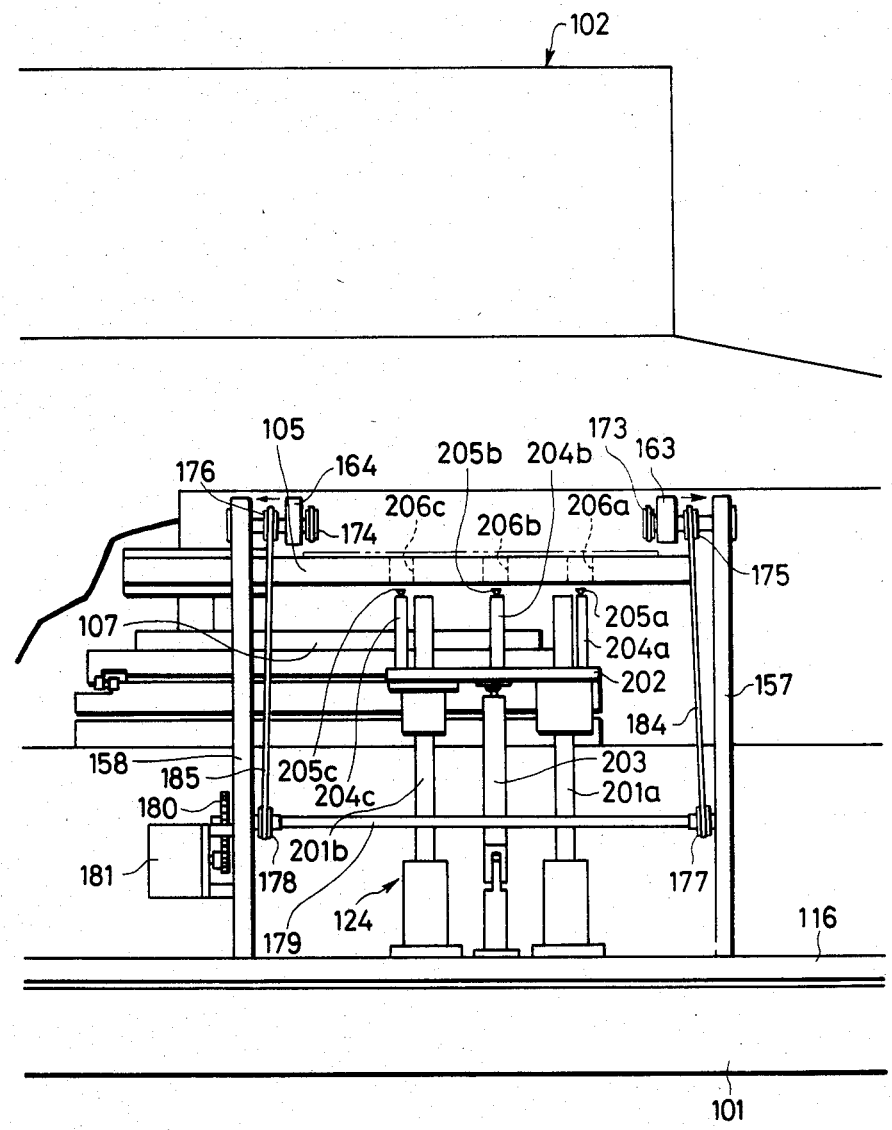
FIG. 9 is a longitudinal cross-sectional view of the same portions.
Figure 10:
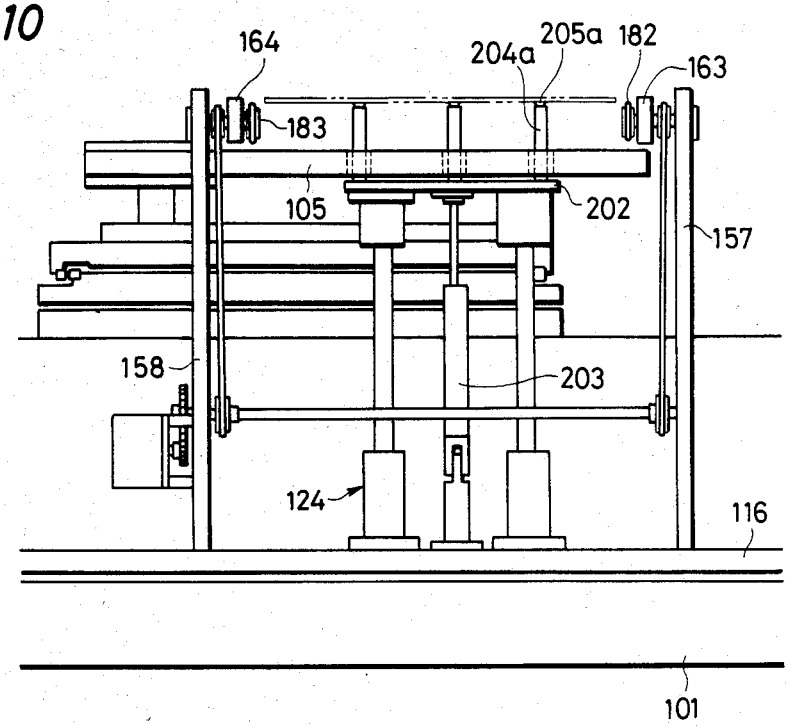
FIGS. 10 and 11 show the variation in position of the movable guide plate in the longitudinal cross-sectional view of FIG. 9.
Figure 11:
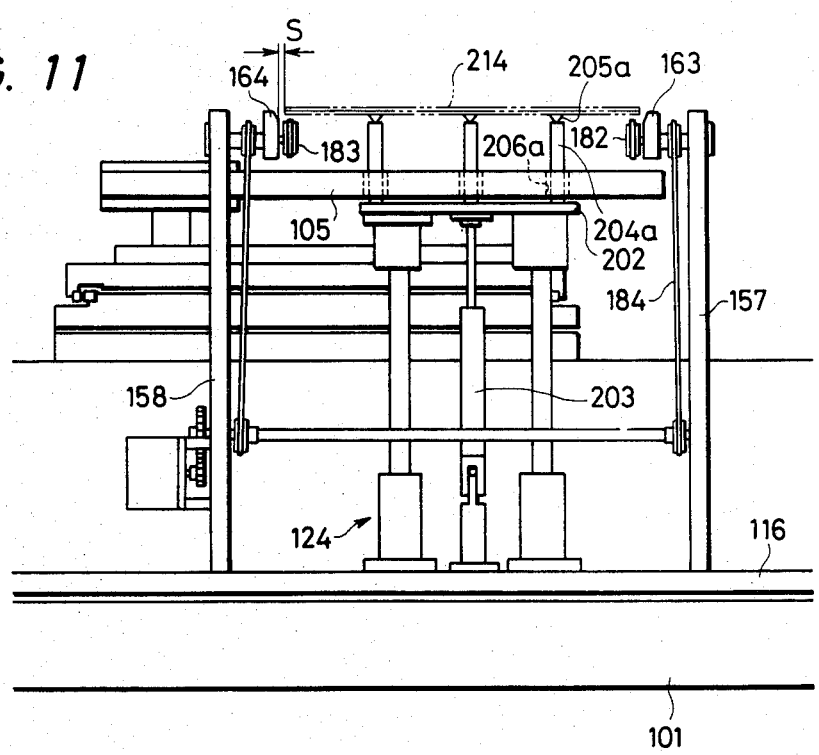
Figure 12:
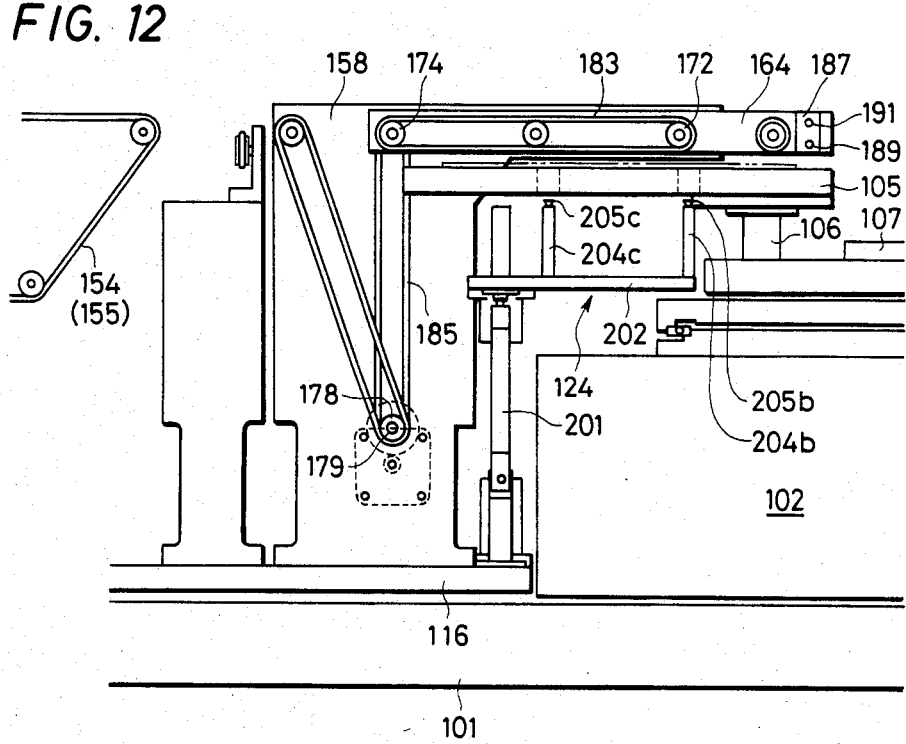
FIG. 12 is a transverse cross-sectional view of portions of a glass delivering and conveying device.
Figure 13:
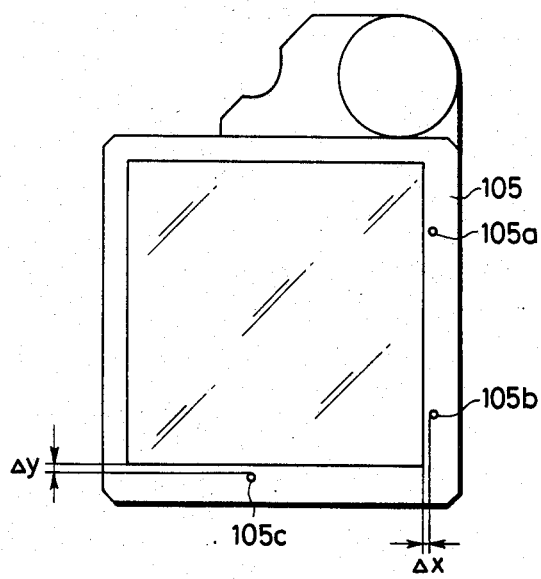
FIG. 13 shows the positional relation when a lower glass substrate is placed on a lower glass substrate supporting table.
Figure 14:
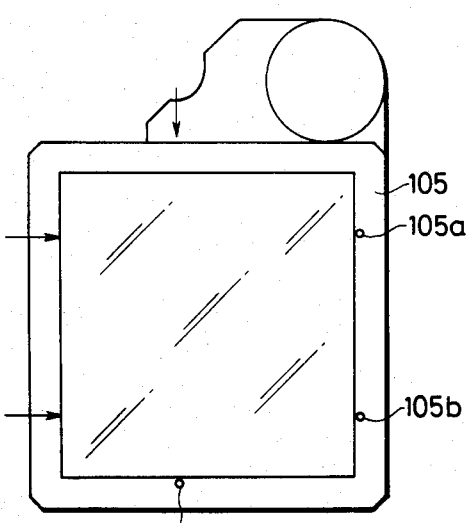
FIG. 14 is a plan view of the lower glass substrate when positioned.
Figure 15:
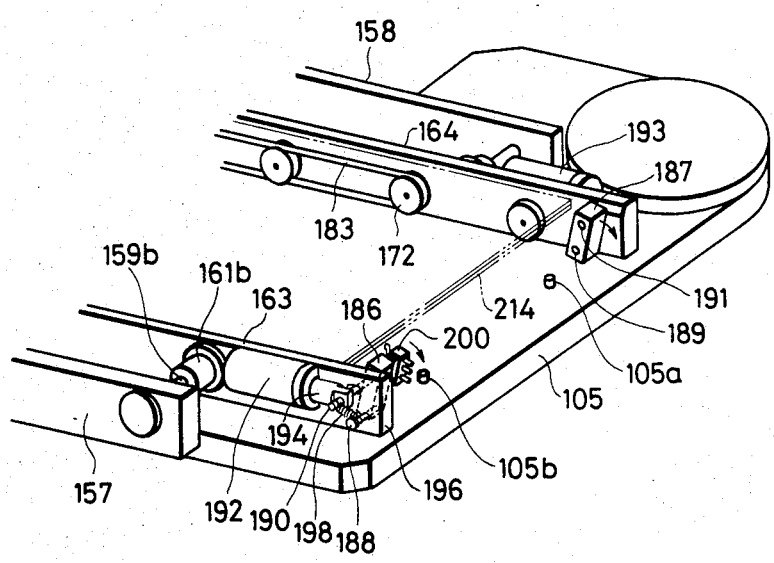
FIG. 15 illustrates the movement of the glass stopper of the glass delivering and conveying device.

Also, as shown in FIGS. 8 and 15, on the inner sides of the end portions of the movement guide plates 163 and 164, stoppers 186 and 187 are pivotably mounted on shafts 188 and 189 (FIG. 15), respectively, and shafts 190 and 191 studded on these stoppers 186 and 187, respectively, are engaged with the piston rods 194 and 195 of air cylinders 192 and 193 provided on the outer sides of the ends of the aforementioned movement guide plates 163 and 164. Springs 198 and 199 are extended between the grooved portions at the ends of the shafts 188, 189 and spring securing shafts 196, 197 studded on the outer sides of the movement guide plates 163, 164, respectively, and the stoppers 186 and 187 are biased in the direction of the arrow of FIG. 8 by these springs. A switch 200 is mounted on the stopper 186.

At the central portion of the glass delivering device 123, the glass plate lifting device 124 (FIG. 9) is provided uprightly on the aforementioned sub-base plate 116. The glass plate lifting device 124 comprises guide shafts 201a, 201b and an air cylinder 203. The guide shafts 201a, 201b and the air cylinder 203 are provided uprightly on the sub-base plate 116. A lift plate 202 is supported on the upper ends of the guide shafts 201a, 201b and the air cylinder 203, and the lift plate 202 is adapted to be moved up and down along the guide shafts 201a, 201b by the operation of the air cylinder 203. Hollow shafts 204a, 204b and 204c are provided uprightly on the lift plate 202, and suckers 205a, 205b and 205c are mounted on the upper ends of the hollow shafts 204a, 204b and 204c, respectively. These hollow shafts 204a, 204b and 204c are connected to a vacuum pump (not shown) through flexible pipes (not shown) such as vinyl pipes. The aforementioned lower glass substrate supporting table 105 is formed with holes 206a, 206b and 206c and the hollow shafts 204a, 204b and 204c are adapted to be vertically slidden in the holes 206a, 206b and 206c by upward and downward and movement of the lift plate 202.

Now, turning back to FIG. 6, on that side of the lower glass cassette lifting device 117 opposite to the side on which the belt conveyor 120 is disposed, the cemented glass cassette lifting device and the cemented glass carrying-in device 127 are provided uprightly on the sub-base plate 116. As regards the cemented glass cassette lifting device 125, in FIG. 6, a cassette supporting table 209 is adapted to be moved up and down by guide struts 207a, 207b, 207c studded on the sub-base plate 116 and a feed screw 208 rotated by a motor and an interlocking gear, the feed screw 208 being also studded on the sub-base plate 116. The cassette supporting table 209 is a part of the cemented cassette lifting device 125 and the cemented glass cassette 126 is supported on the cassette supporting table 209. A window hole 213 is formed in the bottom surfaces of the cemented glass cassette 126 and the cassette supporting table 209. In FIGS. 5–6, at the central portion of the cemented cassette lifting device 125, the cemented glass carrying-in device 127 is provided uprightly on the sub-base plate 116. The cemented glass carrying-in device 127 comprises frames 210a, 210b, pulleys 211a, 211b and belts 212a, 212b, the frames 210a and 210b being provided uprightly on the sub-base plate 116. A shaft is studded on the upper end portions of the frames 210a and 210b, and pulleys 211a and 211b are supported on this shaft. Belts 212a and 212b are passed over these pulleys 211a and 211b, respectively, and the pulleys 211a and 211b are rotated by a motor (not shown). The frames 210a, 210b, the pulleys 211a, 211b and the belts 212a, 212b jut out from the aforementioned window hole 213. The cemented glass plates carried to the front of the cemented glass cassette 126 are adapted to be carried into the cemented glass cassette 126.

Now, FIGS. 10–13 illustrate the positional relation between the lower glass substrate supporting table 105 and the lower glass plate. Positioning pins 105a, 105b and 105c are studded on the upper surface of the lower substrate supporting table 105 (FIG. 13), and $\Delta x$ and $\Delta y$ designate the gaps between the lower glass plate supported on the lower glass substrate supporting table 105 and the positioning pins 105a, 105b, 105c.

Now, in the above-described construction, the operation of the present invention will hereinafter be described.

In FIG. 5, the upper glass plate drawn out of the upper glass cassette 112 on the upper glass cassette lifting device 111 by the glass drawing-out device 113 is placed onto the upper glass conveying guide plates 113a and 113b, and when the reciprocal conveying device 114 shifts leftwardly as viewed in FIG. 5, the upper glass plate adsorbing conveyor 113' provided on this reciprocal conveying device 114 adsorbs the upper glass plate and moves leftwardly, and the upper glass plate is placed onto the upper glass substrate supporting table 103. Then, the upper glass plate is pushed to the positioning pins 103a, 103b, 103c by a pusher and adsorbed and held by an adsorbing hole (not shown) provided in the upper glass substrate supporting table 103. On the other hand, a glass substrate 132 in the lower glass cassette 118 on the lower glass cassette lifting device 117 is fed to the belt conveyor 120 by the belts 140a and 140b (FIG. 6). The fore end portion of the glass substrate 132 is placed onto the guide frames 142a and 142b, but the glass substrate 132 is placed onto the belts 144a and 144b and bears against the side wall 147 of the guide device 121, and when the fore edge of the glass substrate 132 strikes against the switch 148 disposed on the center of the side wall 147, the switch 148 is actuated, whereby the motor which is driving the belts 144a and 144b is stopped and the belts 144a and 144b are also stopped. Subsequently, the relay conveyor 122 moves up and the glass substrate 132 is raised by the belts 154 and 155 disposed on the opposite sides of the relay conveyor 122. At the same time, the guide plate 156 is also moved up and receives the rear edge of the glass substrate 132. When the relay conveyor 122 has moved up to its upper limit while holding the glass substrate 132, the belts 154 and 155 are moved round and the glass substrate 132 is fed to the right-hand side of FIG. 6 and travels toward the glass delivering device 123. At this time, the glass substrate 132 is in its position shown in FIG. 8 and is conveyed on the belts 182 and 183 with its opposite side edges controlled by the inner side surfaces 163a and 164a of the movement guide plates 163 and 164, and the fore edge of the glass substrate 132 strikes against the stoppers 186 and 187 and thereby the glass substrate is stopped and, at the same time, the glass substrate bears against the switch 200 to actuate this switch 200, whereby the belts 182 and 183 are stopped. Thereupon, the lift plate 202 of the glass lifting device 124 (FIG. 9) moves up and hollow posts 204a, 204b and 204c provided uprightly on the lift plate 202 move up through holes 206a, 206b and 206c formed in the lower glass substrate supporting table 105, and the suckers 205a, 205b and 205c provided at the ends of the hollow posts 204a, 204b and 204c come into contact with the glass substrate 132 held by the movement guide plates 163 and 164 of the glass delivering device 123, and the suckers 205a, 205b and 205c adsorb the glass substrate 132 and further raise the glass substrate 132. When the aforementioned lift plate 202 has reached its upper limit, the movement guide plates 163 and 164 of the glass delivering device 123 are moved in the direction of the arrow of FIG. 9 from the position of FIG. 8 and assume the position of FIG. 10. Subsequently, with the glass substrate 132 being adsorbed by the suckers 205a, 205b and 205c, the lift plate 202 of the glass lifting device 124 is guided downwardly along the guide shafts 201a, 202b and 201c by the operation of the air cylinder 203 and places the glass substrate 132 onto the lower glass substrate supporting table 105, and then releases the adsorption of the lower glass substrate 132 to the suckers 205a, 205b and 205c. The lift plate 202 is further guid-de downwardly along the guide shafts 201a, 201b and 201c by the operation of the air cylinder 203 and is stopped at its lower limit position. Now, the glass substrate 132 placed on the lower glass substrate supporting table 105 is in the position of FIG. 13 and is displaced by $\Delta x$ and $\Delta y$ in two directions as indicated by arrows in FIG. 14 by a pusher (not shown) and is pushed against the positioning pins 105a, 105b and 105c and positioned thereby, and then is adsorbed and held by an adsorbing hole (not shown) provided in the lower glass substrate supporting table 105. Thereafter, the upper glass substrate supporting table 103 and the lower glass substrate supporting table 105 are turned in the directions of the arrows of FIG. 5 with the upper glass substrate and the lower glass substrate being adsorbed and held thereon and are superposed one upon the other on the central stage 107, and the alignment marks on the upper and lower glass substrates are made coincident with each other, and the stage 107 is moved up and the upper and lower glass substrates are pressed and cemented together. After the stage 107 has been moved down, the lower glass substrate supporting table 105 is turned in the opposite direction and returns to the position of FIG. 5 with the cemented glass substrates remaining adsorbed and held on the lower glass substrate supporting table.

Thereafter, the glass lifting device 124 (FIG. 4) is again moved up and the cemented glass substrates on the lower glass substrate supporting table 105 are adsorbed by the suckers 205a, 205b and 205c and raised. When the cemented glass substrates have come to the dot-and-dash line position of FIG. 10, the movement guide plates 163 and 164 of the glass delivering device 123 are moved inwardly by the operation of the air cylinders 165 and 166 in the push direction and brought to the position of FIG. 11. At this time, the upper and lower glass substrates are cemented together in a position in which they are positioned by the positioning pins 103a, 103b, 103c of the upper glass substrate supporting table 103 and the positioning pins 105a, 105b 105c of the lower glass substrate supporting table 105. Therefore, as compared with the time when the lower glass substrate has been first carried there on the belts 182 and 183 of the glass delivering device 123, the cemented glass substates are displaced by $\Delta x$ and $\Delta y$ in two directions as viewed from the position of FIG. 8. Therefore, it is necessary to move the stoppers 186, 187 and the movement guide plate 163 by at least $\Delta x$ and $\Delta y$ in two directions, respectively. That is, the stoppers 186 and 187 (FIG. 8) are shifted to the position of FIG. 15 by the tensile forces of the springs 198 and 199 by evacuating the air cylinders 192 and 193 at the ends of the movement guide plates 163 and 164. Also, in FIG. 11, the movement guide plate 163 is shifted outwardly by S ($S \geq \Delta y$) by the operation of the air cylinder 168 in its pull direction. In this state, the lift plate 202 moves down and with the cemented glass substrates being placed on the belts 182 and 183 of the movement guide plates 163 and 164, the belts 182 and 183 are moved in the opposite direction (the leftward direction as viewed in FIG. 6) by reverse revolution of the motor and the cemented glass substrates bear against the switch 145 disposed on the left side of the relay conveyor 122 and actuates the switch 145, thereby stopping the belts. At that time, the relay conveyor 122 moves down and places the cemented glass substrates onto the belts 144a and 144b of the belt conveyor 120. At that time, the guide device 121 is moved down, and then the side wall 147 is moved down to below the cemented glass substrates, and the belts 144a and 144b are moved round to feed the cemented glass substrates into the cemented glass cassette 126. Then, the cemented glass substrates are placed onto the belts 212a and 212b. The cassette supporting table 209 of the aforementioned lifting device 125 is moved down by the operation of the feed screw 208 while being guided by the guide struts 207a, 207b and 207c. Since the window hole 213 is formed in the bottom surfaces of the cemented glass cassette 126 and the cassette supporting table 209, the cemented glass substrates placed on the belts 212a and 212b are received into the cemented glass substrate cassette placed on the cassette supporting table 209.

As described above, one cycle in which the upper and lower glass substrates are supplied to the cementing apparatus and the upper and lower glass plates are cemented together, whereafter the cemented glass substrates are taken up and carried out and received into the cemented glass cassette is finished, and thereafter the same cycle is repeated by the same procedure until the upper glass substates in the upper glass substrate cassette 112 and the lower glass substrates in the lower glass substrate cassette 118 become exhausted. The upper and lower glass substrates contained in the upper glass substrate cassette 112 and the lower glass substrate cassette 118 are received into the cemented glass substrate cassette 126 after cemented together.

As described above, during the series of automatic supply and carry-out operations, glass plates are automatically conveyed in succession to the predetermined position without friction or shock being imparted to the glass plates being conveyed and therefore, the inconvenience that the operator's hand fingers touch the surfaces of the glass plates does not occur at all.

Particularly, in the operation of delivering the glass plates to the lower glass supporting table proposed by the present invention, when glass substrates are moved from the glass delivering and conveying device 123 which is the first positioning means via the glass lifting device 124 to the lower glass supporting table 105 which is the second positioning means, the conveyance is effected with only the particular surface of the glass substrates supported and without the feeding operation by sliding being effected and therefore, no injury or stain is imparted to the cemented surface of the glass substrates.

Also, by changing the set positions of the movement guide plate 163 and stoppers 186, 187 of the glass conveying device 123 correspondingly to the fact that the position of the cemented glass substrates cemented together by the cementing apparatus and coming out therefrom, on the lower glass supporting table 105, differs from the position of the glass substrates during the supply thereof, the unnecessary friction or shock resulting from the edges of the cemented glass substrates riding onto or being rubbed against these positioning members (the movement guide plate 163 and the stoppers 186, 187) is avoided, whereby the deviation or strip-off between the cemented glass substrates which are not yet completely secured to each other immediately after cemented together can be prevented and automatic conveyance thereof can be accomplished safely and reliably.

Also, due to the presence of the amounts of shift $\Delta x$ and $\Delta y$, the lower glass plate carried in can be prevented from riding onto or being rubbed against the positioning pins 105a, 105b and 105c of the lower glass supporting table 105, to thereby accomplish reliable positioning even if the size of the lower glass plate more or less departs from the standard size. This also holds true of the upper glass plate.

Accordingly, if design is made such that the work of cementing glass plates together is carried out by the use of the automatic conveying apparatus according to the present invention, completely manless operation can be accomplished, and this will lead to the saving of personnel expenses and the improved rate of operation of the apparatus as a result of the reduced number of steps of process.

We claim:

1. A press apparatus for planar members having:
   a first transfer table for transferring a first planar member to press position;
   a second transfer table for transferring a second planar member to the press position substantially simultaneously with said first transfer table;
   means for aligning said first and second planar members;
   means for effecting the parallel feeding of said first and second planar members; and
   means for pressing said first and second planar members with a predetermed pressure wherein said first and second transfer tables are rotatively moved to the press position.

2. A press apparatus according to claim 1, wherein said first and second transfer tables are rotatively moved by a Geneva mechanism.

3. A press apparatus according to claim 1, wherein said first and second transfer tables are rotated in opposite directions to each other.

4. A press apparatus according to claim 1, wherein said means for effecting the parallel feeding includes at least three independently driving lift means, said lift means driving together with one another during the press.

5. A press apparatus for planar members having:
   means for conveying a first planar member;
   means for stopping and positioning said first planar member at the terminal end of the conveyance;
   a chuck;
   means for shifting said first planar member to said chuck;
   means for displacing said first planar member to a predetermined position on said chuck;
   a first transfer table for transferring said chuck to a press position;
   a second transfer table for transferring a second planar member to the press position;
   means for aligning said first and second planar members;
   means for effecting the parallel feeding of said first and second planar members; and
   means for pressing said first and second planar members with a predetermined pressure.

6. A press apparatus according to claim 5, wherein said first and second transfer tables are rotatively moved to the press position substantially at a time.

7. A press apparatus according to claim 5, wherein said conveying means is displaced in a direction orthogonal to the direction of conveyance when said first planar member is shifted to the chuck.

8. A press apparatus according to claim 5, further having:
   means for returning the pressed first and second planar members to said first transfer table;
   means for transferring said first transfer table in the opposite direction and returning the pressed first and second planar members to the conveying means; and
   means for displacing said means for stopping and positioning so as not to be an obstacle to conveyance.

9. A press apparatus according to claim 8, wherein said means for conveying the first planar member has a guide for regulating the direction orthogonal to the direction of conveyance, and said guide is displaced so as not to be an obstacle to conveyance when the pressed first and second planar members are conveyed.

10. A press apparatus for planar members having:
    a first chuck for holding a first planar member;
    a first transfer table for transferring said first chuck to a press position;
    means for inclining said first chuck in accordance with the inclination of the upper surface of said first planar member;
    a second transfer table for transferring a second planar member to a press position;
    a second chuck for adsorbing the upper surface of said second planar member;
    means for inclining said second chuck in accordance with the inclination of the lower surface of said second planar member;
    means for aligning said first and second planar members; and
    means for pressing said first and second planar members with a predetermined pressure.

11. A press apparatus according to claim 10, wherein said first and second transfer tables are rotatively moved to the press position substantially at a time.

12. A press apparatus according to claim 11, wherein said first and second transfer tables are rotatively moved by a Geneva mechanism.

13. A press apparatus according to claim 11, wherein said first and second transfer tables are rotated in opposite directions.

14. A press apparatus according to claim 10, wherein said means for inclining the first chuck is provided with at least three independently driving lift means, said lift means driving together with one another during the press.

15. A method for pressing a planar member comprising the following steps:
    (a) providing a press apparatus;
    (b) rotatively transferring a first planar member to a press position of said apparatus employing a first transfer table;

(c) rotatively transferring a second planar member to said press position of said apparatus employing a second transfer table substantially simultaneously with the transfer of said first planar member to the press position;

(d) aligning said first and second planar members;

(e) effecting parallel feeding of said first and second planar members; and (f) pressing said first and second planar members with a predetermined pressure employing said apparatus, wherein said planar members are rotatively transferred to the press position by rotatively moving said first and second transfer tables to the press position.

16. A method according to claim 15, wherein said rotational transfers of the first and second planar members are directionally opposite to each other.

* * * * *